United States Patent [19]

Bellet et al.

[11] Patent Number: 4,790,744
[45] Date of Patent: Dec. 13, 1988

[54] BURNER WITH LOW EMISSION OF POLLUTING GASES

[75] Inventors: Jean-Claude Bellet, Poitiers; Didier Saucereau, Buxerolles; Jean-Joseph Denis, Vouille; Daniel Falaise, Poitiers, all of France

[73] Assignee: Centre National De La Recherche Scientifique, Paris, France

[21] Appl. No.: 26,142

[22] Filed: Mar. 16, 1987

[30] Foreign Application Priority Data

Mar. 14, 1986 [FR] France .................. 86 03697

[51] Int. Cl.⁴ .............................. F23N 5/00
[52] U.S. Cl. .................... 431/75; 431/242; 431/347; 431/350; 431/328; 432/222; 60/749
[58] Field of Search ........... 432/222; 431/215, 242, 431/347, 350, 353, 75, 328; 60/749

[56] References Cited

U.S. PATENT DOCUMENTS

| | | | |
|---|---|---|---|
| 3,540,216 | 11/1970 | Quillevere et al. | 60/749 |
| 3,779,694 | 12/1973 | Zagoroff | 431/347 |
| 3,817,690 | 6/1974 | Bryce et al. | 431/350 |
| 4,120,640 | 10/1978 | Martin | |
| 4,224,019 | 9/1980 | Dilmore | |
| 4,439,135 | 3/1984 | Altemark et al. | |
| 4,530,656 | 7/1985 | Altemark et al. | |
| 4,582,476 | 4/1986 | Altemark et al. | |

FOREIGN PATENT DOCUMENTS

| | | |
|---|---|---|
| 537964 | 5/1982 | Australia . |
| 0071073 | 9/1973 | European Pat. Off. . |
| 0021035 | 1/1981 | European Pat. Off. . |
| 2250766 | 4/1974 | Fed. Rep. of Germany . |
| 1099337 | 9/1955 | France . |

*Primary Examiner*—Carroll B. Dority, Jr.
*Attorney, Agent, or Firm*—Ladas & Parry

[57] ABSTRACT

This invention relates to a burner with low emission of polluting gases, comprising, in a conduit, an injector of fluid fuel which creates in the conduit, supplied with combustion-supporting air heated in an exchanger, a fuel/air mixture. The latter burns, creating a flame which clings to a stabilizer constituted for example by a hollow piece, of V-section, obturating a central part of the cross-section of the conduit. Downstream of this stabilizer there is placed an obstacle causing a local reduction follwed by a sudden increase in the cross-section of the conduit in order to promote oxidation of the carbon monoxide.

11 Claims, 2 Drawing Sheets

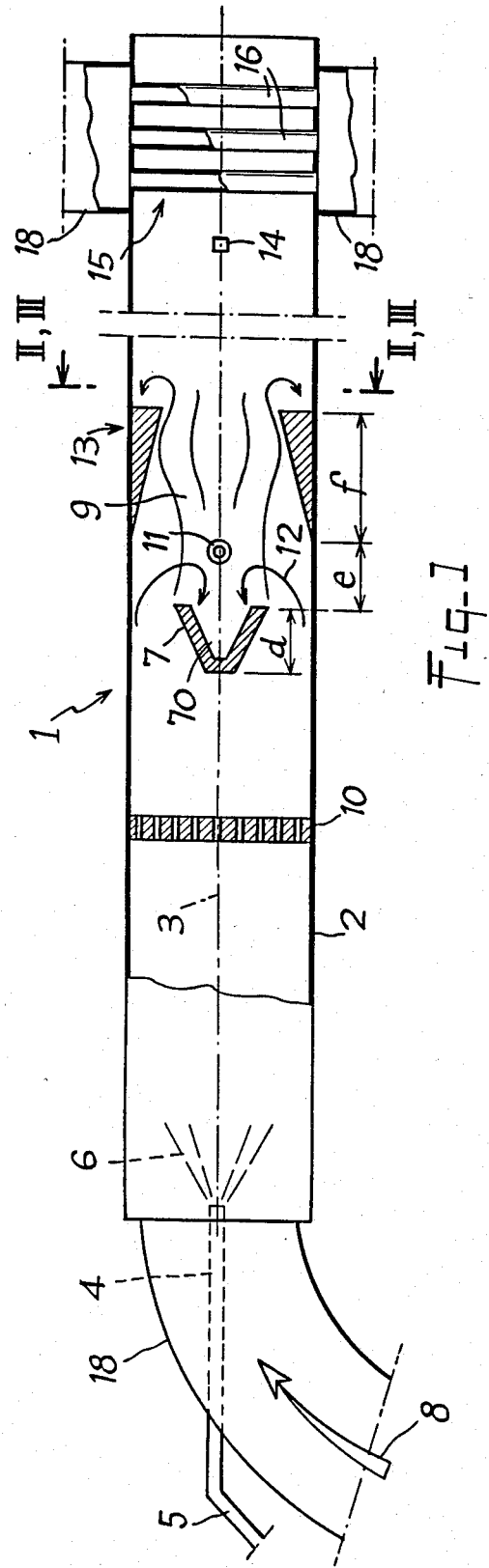
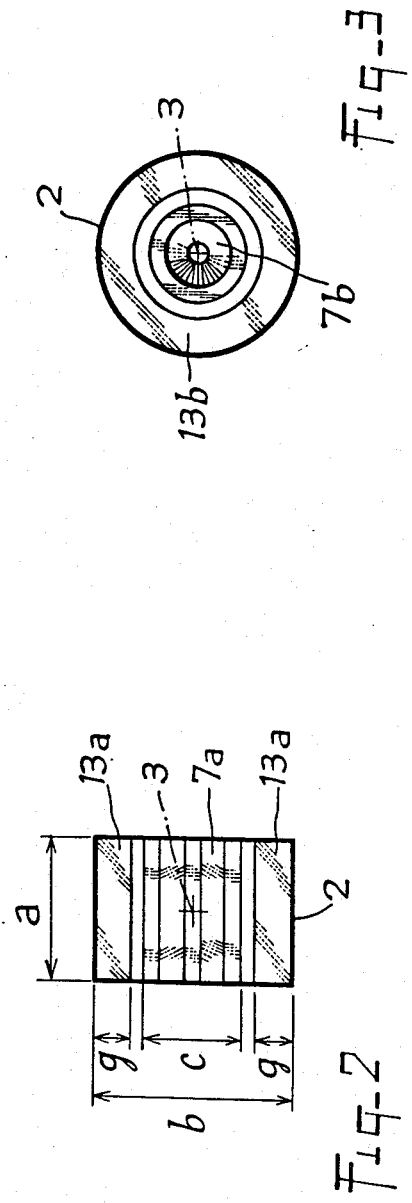

BURNER WITH LOW EMISSION OF POLLUTING GASES

The present invention relates to a burner with low emission of polluting gases, comprising, in a linear conduit, an injector of fluid fuel which creates in the conduit, supplied with combustion-supporting air, a fuel/air mixture which burns, creating a flame which clings to a flame stabilizer disposed in the conduit downstream of the injector.

When the fluid fuel contains carbon (this being the case when it is question of a hydrocarbon), combustion risks producing, in addition to carbonic anhydride, carbon monoxide. In order to obtain complete combustion over a short distance and to reduce the proportion of this latter polluting gas, it is provided to use, as flame stabilizer, a piece obturating a central part of the straight section of the conduit, this piece being adapted to create a zone of recirculation, and to place, downstream of this stabilizer, on the inner face of the wall of the conduit, an obstacle causing a local reduction followed by a sudden increase in the section of the conduit.

The piece constituting the stabilizer may for example have a hollow shape with a V-shaped cross section, disposed so as to flare in the direction of flow of the gaseous mixture.

Thanks to this arrangement, the combustion flame which is produced and which clings to the stabilizer propagates obliquely towards the wall of the conduit, which is attained only at a certain distance downstream of the stabilizer. The obstacle placed in this region of the conduit ensures a mixture of the fresh gases located along the wall of the conduit with the burned gases located within the wake of the stabilizer, with the result that the residue of carbon monoxide CO of the peripheral zone not yet oxidized to the state of carbon dioxide $CO_2$ is returned towards the axis of the conduit where oxidation thereof may take place.

The obstacle, considered in the direction of the longitudinal axis of the conduit, is preferably located opposite that portion of cross-section of the conduit left free by the stabilizer. Furthermore, the obstacle should cover only a fraction of the portion of cross-section of the conduit, and it is advantageously shaped so as to create a progressive reduction of the section of the conduit.

The shape of the stabilizer and that of the obstacle are linked with the shape of the transverse section of the conduit. When the latter is of rectangular form, the stabilizer is preferably constituted by a trough extending transversely, parallel to one of the pairs of opposite sides of the contour of the conduit, the obstacle being composed of two half-obstacles extending parallel to said trough and disposed symmetrically with respect to the axis of the conduit. In a variant embodiment, when the conduit is circular in cross-section, the stabilizer is preferably constituted by a rotational conical piece disposed coaxially to the conduit, the obstacle being formed by a ring likewise coaxial to the conduit.

A transverse perforated plate covering the whole section of the conduit should in addition be provided in the conduit, between the injector and the stabilizer. This plate must be such that it prevents the flame from returning to the injector. Injection of the fuel must be effected so as to obtain a homogeneous distribution, for example by disposing the injector sufficiently far upstream of the plate.

Furthermore, it is known that the reactions of combustion in the air are generally accompanied by the formation of nitrogen oxides NOx. This is principally a process of "thermic formation" depending on the level of temperature of the gases (approximately exponentially) as well as on the dwell time of these gases at high temperature.

Combustion of a fluid fuel/air mixture close to stoichiometry leads to the highest calorific power, therefore to high temperatures and a high rate of thermic formation of NOx. This rate may be reduced by burning a less-rich mixture, which leads to lower temperatures and avoids the gases passing through temperature levels where the formation of NOx is rapid. However, in the case of a hydrocarbon, a sufficient temperature must be maintained to allow complete oxidation of CO into $CO_2$. Efforts are therefore made to maintain the temperature of the gases between 1000° C. and 1500° C.

Pre-heating of the combustion-supporting air makes it possible to decrease richness sufficiently, for example in the vicinity of 0.30–0.35, the value corresponding to the stoichiometric mixture being taken as unit, whilst conserving a stable flame. To this end, a heat exchanger may be disposed at the outlet of the conduit in order to ensure prior heating of the combustion-supporting air introduced at the inlet of the conduit to form the fuel/air mixture. This heat exchanger is preferably located at a sufficient distance from the obstacle mentioned above to allow complete combustion in the corresponding space of the carbon monoxide contained in the gases issuing from the flame before said gases undergo a cooling upon passage in the heat exchanger.

A burner according to the invention is advantageously provided with a regulation device controlling the flowrate of the fluid fuel injected as a function of the desired temperature in the conduit downstream of the flame. The particular role of such a device is to allow piloting of the combustion during the initial phase of ignition and of rise in capacity of the burner.

The invention will be more readily understood on reading the following description with reference to the accompanying drawings, in which:

FIG. 1 schematically shows, in longitudinal section, a burner according to the invention.

FIGS. 2 and 3 show cross-sections of the burner of FIG. 1 along merged lines II—II and III—III, in two variant embodiments respectively, namely with a conduit of rectangular section and with a conduit of circular section.

Figure 4:
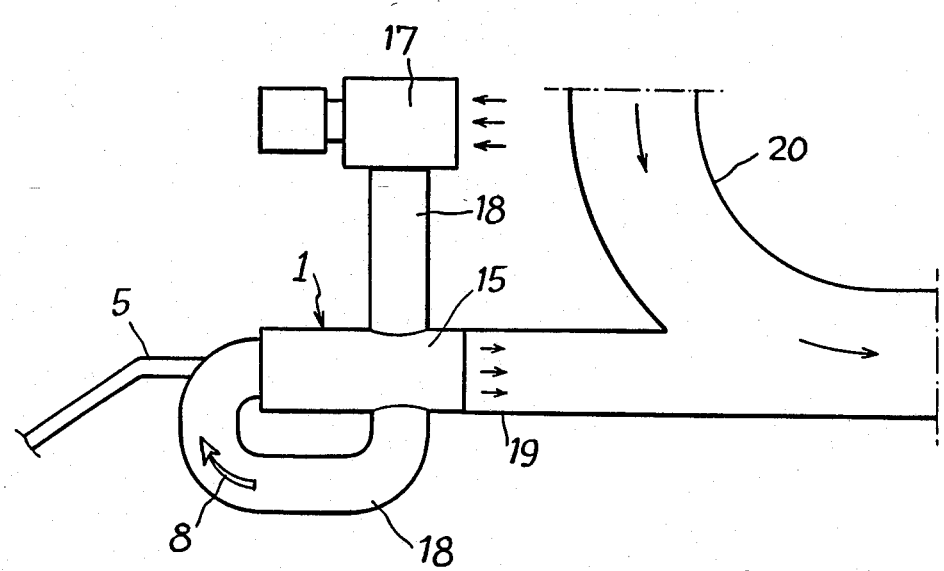
FIG. 4 shows a burner with pre-heating of the combustion-supporting air.

Referring now to the drawings, the burner 1 shown in FIG. 1 comprises, in a conduit 2 with longitudinal axis 3, an injector 4 connected to a supply pipe 5 which emits a jet 6 of combustible gas with the same axis 3 as conduit 2, in the direction of a flame stabilizer 7. The conduit 2 receives a flow of combustion-supporting air 8 which allows the injected combustible gas to burn, creating a flame 9 downstream of the stabilizer 7. The air seeded with combustible gas reaches the stabilizer 7 through an anti-backfire device 10 constituted by a plane perforated ceramic plate disposed perpendicularly to axis 3 and of which the holes are sufficiently fine to prevent the flame 9, ignited with the aid of a retractable spark plug 11, from returning upstream towards injector 4.

The flame stabilizer 7 is in the form of an obstacle disposed inside the conduit 2, tranversely to axis 3 thereof, on which it is centered. This obstacle is tapered in the direction of flow of the gases and presents a cavity 70 downstream so as to create a swirling movement 12 ensuring that the flame 9 clings on the stabilizer 7.

Due to the level of temperature of the burned gases required for oxidation of the carbon monoxide ($T > 1000°$ C. about), the formation of this oxide is not uniform over the cross-section of the conduit. When, at a certain distance downstream of the stabilizer 7, combustion is terminated with, in particular, the oxidation of the CO initially formed, this does not apply along the wall of the conduit 2 in the cross-section located at the same distance from the stabilizer. In fact, due to the oblique propagation of the flame 9 from the stabilizer, the reactions of oxidation of the gases in the same transverse plane do not have the same degree of advance depending on whether the gases are considered in the vicinity of the central part of the conduit 2 corresponding to the wake of the flame stabilizer or in the vicinity of its wall.

In order to obtain a substantially complete combustion of the CO issuing from the peripheral region of the flame 9, the gases are mixed by disposing, downstream of and at some distance from the stabilizer 7, an obstacle 13 which creates a reduction in the section of the conduit 2 tending to return the gases close to the wall towards the axis 3 of said conduit.

The obstruction by obstacle 13 of a peripheral part of the section of the conduit (for example 50 to 60%), ends abruptly, downstream, this creating eddies which ensure intense mixing of the gaseous flow issuing from the combustion flame. Such mixing reheats the gases of which oxidation is not terminated and allows the combustion of the CO to be continued. Correlatively, the burned gases are momentarily cooled, which considerably slows down the thermic formation of the NOx. These two effects combine to obtain a low degree of pollution.

In order to avoid vibrations occurring, the shape given to the obstacle 13 is such that the reduction in cross-section that it creates in the direction of flow is not sudden, but progressive. To this end, it offers an oblique internal surface which approaches axis 3 in a moderate slope.

The structure of the stabilizer 7 and of the obstacle 13 depends on the shape of the cross-section of the conduit 2. For example, in the case of a rectangular cross section (FIG. 2), the stabilizer is constituted by an obstacle 7a in the form of a trough, offering a V-section and extending perpendicularly to the axis 3 of conduit 2, symmetrically with respect thereto and parallel to one of the pairs of opposite sides of the conduit (in the present example, the small sides), the apex of the V facing upstream of the flow in said conduit. As to obstacle 13, it is in that case constituted by two half-obstacles 13a disposed along the walls of the conduit 2, symmetrically with respect to its axis 3, which extend parallel to stabilizer 7.

FIG. 3 relates to a variant embodiment wherein the conduit 2 has a circular cross section. In this case, the stabilizer 7 takes the form of the top part 7b of a hollow rotation cone with the same axis 3 as conduit 2, whilst the obstacle 13 is constituted by a coaxial annular piece 13b offering a truncated conical internal surface.

As shown in FIGS. 2 and 3, the obstacles 13a or 13b, located in the region where the flame 9 attains the wall of conduit 2, occupy almost all that part of the section of the latter left free by the stabilizer 7. These obstacles may be formed by solid pieces of triangular cross-section (as shown), or by simple thin deflectors oriented obliquely towards the axis 3 of the conduit.

Downstream of obstacle 13 is placed a temperature sensor 14 measuring the temperature created by the flame 9 and controlling a valve for adjusting the fuel flowrate (not shown), so as to maintain this temperature equal to a possibly variable reference value. Such a regulation makes it possible in particular optimally to adjust the richness of the mixture during the phase of ignition of the burner.

The flow of combustion-supporting air 8 may advantageously be previously heated by passage through a heat exchanger 15, provided in the conduit 2 downstream of obstacle 13 (FIGS. 1 and 4). This exchanger, through which flows the hot gaseous flux issuing from flame 9, is composed for example of a bundle of tubes 16 traversing the conduit 2 and through which passes the combustion-supporting air issuing from a fan 17 and conducted via a conduit 18 towards the inlet of burner 1. This air is thus heated by the combustion gases. In order better to control the temperature, the walls in contact with the gaseous flow are made of insulating refractory material.

Pre-heating of the combustion air makes it possible for the burner to operate with a relatively poor mixture so as to reduce the proportion of nitrogen oxides NOx in the burned gases. In fact, a richness of low value may in that case be chosen, included for example between 0.30 and 0.35 with, however, obtaining of a stable flame 9 in the wake of the stabilizer 7. Under these conditions, where the temperature remains lower than 1500° C., the formation of NOx remains moderate.

The distance at which the exchanger 15 is placed downstream of flame 9 must be such that the conversion of CO into $CO_2$ is sufficiently advanced at the level of the exchanger, but without risk of considerable additional formation of NOx and of exaggerated lateral heat losses. This distance results from a compromise between the emissions of NOx and of CO tolerated for the particular use in question.

In a particular embodiment of a burner 1 operating with propane, with preheating of the combustion-supporting air, and comprising a conduit 2 of rectangular section $a \times b = 93 \times 130$ mm, the anti-backfire safety device 10 is constituted by a ceramic plate pierced with 3500 holes of 1 mm; the flame stabilizer 7 is constituted by a trough of height $c = 63$ mm and of length $d = 45$ mm. At a distance $e = 45$ mm downstream of the stabilizer are disposed two half-obstacles 13a of triangular longitudinal section, of length $f = 90$ mm and of height $g = 25$ mm. The stabilizer and the obstacles are made of refractory fiber. Tests show that it is necessary to dispose the exchanger at a distance of about 1 meter from the half-obstacles 13a to obtain complete combustion.

For a richness of the air-propane mixture equal to 0.32, the power of the burner being about 44 kW, the temperatures which appear along the conduit are as follows:

about 320° C. upstream of the point of injection of the fuel (temperature of the air reheated by exchanger 15);

about 1090° C. between the obstacle 12 and the exchanger 15;

about 850° C. at the outlet of the exchanger 15, where the hot gases issuing from the burner are available for any application.

In the burned gases at 1060 mm downstream of the stabilizer 7, a proportion of CO of less than about 5 ppm and a proportion of NOx of about 0.8 ppm are noted, this corresponding to about 4 mg of NOx produced per kWh. Whilst being of the same order of magnitude, the results obtained with methane are even better.

It should be noted that the configuration of the burner makes it possible, without preheating of the air, to obtain emissions of NOx which, although 4 to 5 times greater, may be acceptable for certain applications.

Furthermore, during tests with biomethane (methane 55% - carbon dioxide 45%), this burner produces 2 mg of NOx per kWh for a power of 16 kW, the production of CO remaining very low.

Finally, measurements made with complete combustion of a methane (10%) - nitrogen (90%) mixture (simulation of fuels with low calorific power of about 3 MJ/m$^3$), show a proportion of NOx of 10 mg/kWh for a power of 11 kW.

Figure 5:
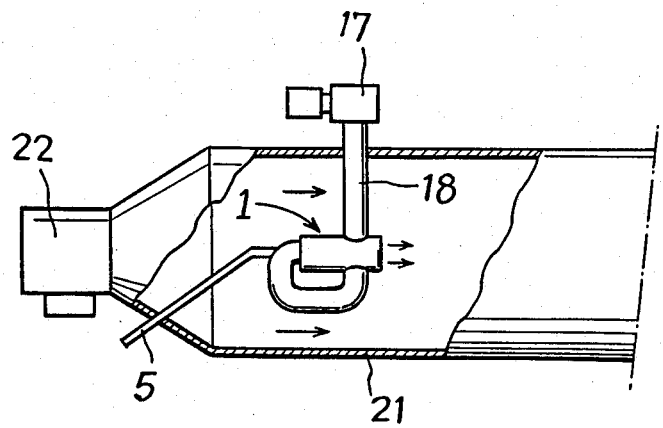
FIG. 5 shows an air stream burner made by means of the device of FIG. 4.

A burner 1, with or without preheating of air, may constitute per se a low-pollution heat generator, able to furnish gases 19 at relatively high temperature compatible with the operational conditions. For applications at more moderate temperature, it is possible to heat the gaseous flow of a conduit 20 by mixture with the hot gases issuing from the generator as indicated in FIG. 4. Finally, this generator may by integrated within a jacket to obtain an air stream burner. FIG. 5 shows a jacket 21 defining an air stream supplied by a fan 22 and containing such a burner 1. The latter is supplied with combustible gas via pipe 5 and with air via conduit 18 with the aid of the auxiliary fan 17. This latter use is interesting when it is important to minimize heat losses with the outside.

What is claimed is:

1. Burner with a low emission of polluting gases, comprising:
   a straight conduit well which is made of refractory insulating material,
   an injector of fluid fuel which is supplied with combustion-supporting air and injects, in said conduit, a fuel/air mixture which burns, creating a flame,
   a flame stabilizer disposed in said conduit and formed by a piece made of refractory material, which obturates a central part of the cross-section of said conduit and is adapted to create a zone of recirculation, and an obstacle made of insulating refractory material, which is placed on the inner face of the wall of the conduit and causes a local reduction followed by a sudden increase of the cross-section of said conduit.

2. The burner of claim 1, wherein the piece constituting the stabilizer presents a hollow shape with a V-cross-section, and is disposed so as to flare in the direction of flow of the gaseous mixture.

3. The burner of claim 1, wherein the obstacle, considered in the direction of the longitudinal axis of the conduit, is located opposite that portion of cross-section of conduit left free by the stabilizer.

4. The burner of claim 1, wherein the obstacle covers a fraction only of the portion of cross-section of conduit left free by the stabilizer.

5. The burner of claim 1, wherein the obstacle is shaped so as to create a progressive reduction in the cross-section of the conduit.

6. The burner of claim 2, wherein the cross-section of the conduit is rectangular and the stabilizer is constituted by a trough extending transversely, parallel to one of the pairs of opposite sides of the contour of the conduit, the obstacle being composed of two half-obstacles extending parallel to said trough and disposed symmetrically with respect to the axis of the conduit.

7. The burner of claim 2, wherein the conduit is circular in cross-section and the stabilizer is constituted by a conical piece disposed coaxially to the conduit, the obstacle being formed by a ring likewise coaxial to the conduit.

8. The burner of claim 1, wherein, between the injector and the stabilizer is placed transversely in the conduit a perforated plate covering the whole section of said conduit.

9. The burner of claim 1, wherein, at the outlet of the conduit, there is disposed a heat exchanger intended to ensure prior heating of the combustion-supporting air introduced at the inlet of the conduit.

10. The burner of claim 9, wherein the heat exchanger is located at a sufficient distance from the obstacle to allow complete combustion in the corresponding space of the carbon monoxide issuing from the flame.

11. The burner of claim 1, wherein it is provided with a regulation device controlling the flowrate of the fluid fuel injected as a function of the desired temperature in the conduit downstream of the flame.

* * * * *